March 10, 1925.

H. HOEGBERG

SCRAPER FOR REMOVING WALL PAPER

Filed Sept. 17, 1924

1,529,309

INVENTOR
Hjalmar Hoegberg
BY
ATTORNEY

Patented Mar. 10, 1925.

1,529,309

UNITED STATES PATENT OFFICE.

HJALMAR HOEGBERG, OF NEW YORK, N. Y.

SCRAPER FOR REMOVING WALL PAPER.

Application filed September 17, 1924. Serial No. 738,311.

*To all whom it may concern:*

Be it known that HJALMAR HOEGBERG, subject of the King of Sweden, residing at New York, N. Y., in the county of New York and State of New York, has invented certain new and useful Improvements in Scrapers for Removing Wall Paper, of which the following is a specification.

This invention relates to a scraper intended for use in removing wall paper from walls, the invention having for an object the provision of a novel and simple scraper of this type; a further specific object relating to the provision of a simple means for attaching the blade to the handle in the manner to permit of angular adjustment of the blade on the handle.

For further comprehension of the invention, and of the objects and advantages thereof, reference will be had to the following description and accompanying drawing, and to the appended claims in which the various novel features of the invention are more particularly set forth.

Fig. 1 of the drawing is a face view of my improved scraper.

Figure 1:
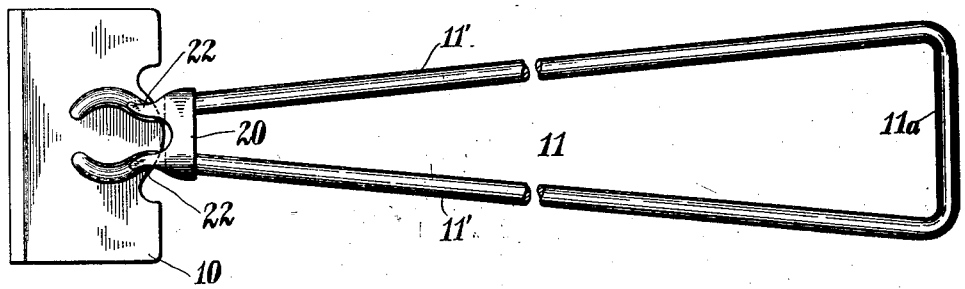
Figure 2:
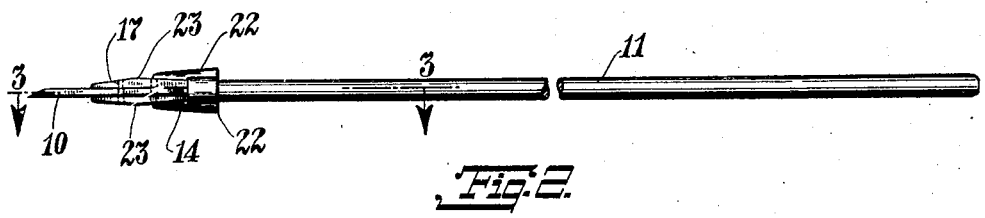
Fig. 2 is a side view thereof.
Figure 3:
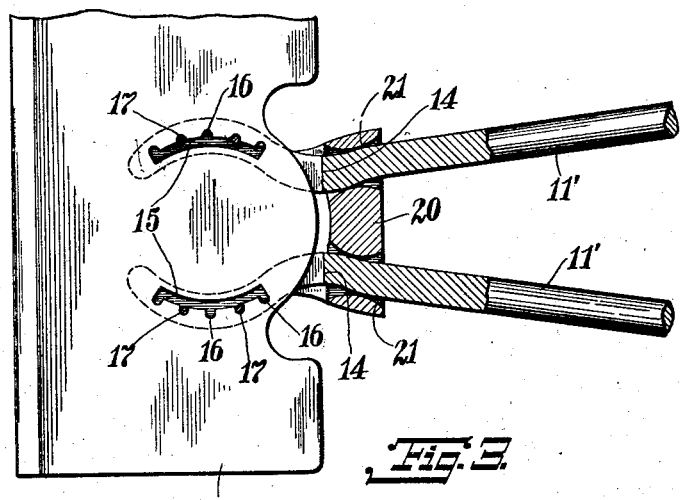
Fig. 3 is an enlarged fragmentary sectional view taken on the line 3—3 of Fig. 2.

As here embodied my improved scraper comprises a blade 10 and a handle 11, the blade being formed of a thin piece of steel and arranged to present its cutting or scraping edge transversely to the handle. The handle is preferably formed from a bar of metal that may be of circular cross section and which is bent to form two reaches 11′, that are united at their outer ends, that is the ends removed from the blade, by a transverse intermediate portion 11ª, the two reaches converging toward one another from the outer end of the handle toward the blade as shown.

The ends of the handle that engage the blade are each formed with slots such as 14 entered longitudinally thereinto to bifurcate said ends, these bifurcated ends straddling the blade 10. Formed in the blade are two slots or elongated apertures 15 each having a number of offset recesses 16 spaced along one side thereof. These recesses having engaged therein the pins 17. Each pin 17 is fixed to one leg of the bifurcated handle end and projects freely into an aperture in the other leg. These pins 17 are retained in engagement with the offsets 16 by means of a locking bar 20 that extends transversely of the handle and is formed at opposite ends with apertures 21 through which the two reaches of the handle pass. Formed on this bar 20, adjacent each aperture, are the pairs of fingers 22 that project toward the blade 10 and which are adapted to engage cam surfaces 23 on the outer faces of the bifurcated handle ends to compress the said ends against the blade and so lock the latter firmly to the handle.

As will be apparent from the above description, the blade may be readily loosened for angular adjustment by pulling the locking bar 20 backward from the blade 10, causing the pins 17 to leave the offsets 16 with which they may be engaged and move into the main lengths of the slotted apertures 15. The blade may then be readily adjusted to position its cutting or scraping edge at an oblique angle with respect to the handle, the blade being again locked in position by moving the bar 20 toward the blade, the pins 17 then entering different ones of the offset 16, while the fingers 22 engage the cam elements 23 and clamp the bifurcated handle ends against the blade. At the same time the bar 20 wedges between the two reaches of the handle and is locked in place.

In the use of my improved scraper the workman preferably grasps the transverse element 11ª with one hand and bears with the other hand upon the handle, at a point near the blade.

Having thus described my invention, what I claim as new and desire to protect it by Letters Patent of the United States is as follows:—

1. A scraper comprising a blade, a handle in the form of a rod arranged in two reaches inclined with respect to one another and having bifurcated ends that straddle the blade, a locking bar having apertures in its ends through which the said handle reaches pass, and means on said bar adapted to engage the bifurcated ends of the handle to clamp the same upon the blade.

2. A scraper comprising a blade, a handle in the form of a rod arranged in two reaches inclined with respect to one another and having bifurcated ends that straddle the blade, a locking bar having apertures in its ends through which the said handle reaches pass, and means on said bar adapted to engage the bifurcated ends of the handle to clamp the same upon the blade, said means comprising pairs of fingers projected from said locking bar over the said handle ends.

3. A scraper comprising a blade, a handle in the form of a rod arranged in two reaches inclined with respect to one another and having bifurcated ends that straddle the blade, said blade being formed with a pair of slotted apertures having offset recesses spaced therealong, pins in said handle ends engaging in said recesses, and a locking bar having apertures in its ends through which the said handle reaches pass.

4. A scraper comprising a blade, a handle in the form of a rod arranged in two reaches inclined with respect to one another and having bifurcated ends that straddle the blade, said blade being formed with a pair of slotted apertures having offset recesses spaced therealong, pins in said handle ends engaging in said recesses, and a locking bar having apertures in its ends through which the said handle reaches pass, and fingers projected from said locking bar over the said handle ends to engage the latter and clamp the same upon the blade when the locking bar is moved to operative position along said handle.

In testimony whereof I have affixed my signature.

HJALMAR HOEGBERG.